Aug. 16, 1960  E. M. ROTHERMEL ET AL  2,949,133
FLEXIBLE CONDUIT
Filed March 24, 1955

INVENTOR.
EDWARD M. ROTHERMEL
RUSSELL B. WADDELL JR.
BY
ATTORNEY

United States Patent Office 2,949,133
Patented Aug. 16, 1960

2,949,133

FLEXIBLE CONDUIT

Edward M. Rothermel and Russell B. Waddell, Jr., Waynesville, N.C., assignors to Dayco Corporation, a corporation of Ohio Filed Mar. 24, 1955, Ser. No. 496,507

6 Claims. (Cl. 138—56)

The present invention relates to improved non collapsible, flexible conduits, and this application is a continuation-in-part of applications Serial No. 398,126 for flexible conduits, filed December 14, 1953, now Patent No. 2,782,803, and Serial No. 448,722 for Method for Manufacturing Fexible Conduits, filed August 9, 1954, now Patent No. 2,766,806.

In certain of the domestic and industrial arts it has become desirable to employ a fluid-impervious hose or conduit which is at once readily flexible and of sufficient radial strength to prevent collapse thereof when the conduit is subjected to severe flexing or radial loads from exterior sources. Where the fluid to be conveyed by said hose moves at a substantial velocity and particularly where such fluid is in a gaseous state, it has been found further desirable that the flexible, radially reinforced conduit have a substantially smooth interior surface so that a minimum of resistance will be offered by the conduit to the free flow of the material therewithin. To provide the desired radial reinforcement and resistance to collapse of the hose, it has been the practice to employ a circumferential reinforcement in the form of coiled wire or fabric wrappings. Where the coiled wire was employed, it proved convenient to enhance the flexibility of the hose or conduit by corrugating the rubber or rubberized fabric body of the same between the turns of the coiled wire. The nature of the wire spring, however, was such that when it was embedded in a rubber body, it would tend to separate therefrom, thereby destroying the desired reinforcing effect and rendering the hose unsuitable for further use. If, on the other hand, as has been the prominent practice prior to this invention, the coiled wire is embedded between layers of fabric to prevent it from cutting through the rubber tube, the hose has suffered for the loss of the desired flexibility.

Other attempts have been made to introduce the coiled wire into a tubular rubber hose body such that the wire lies along the inner surface of the rubber member rather than being embedded therein. This arrangement has proven unsatisfactory, however, in view of the fact that the wire has been exposed to the fluids flowing within the conduit resulting in its corrosion. Furthermore, in order to hold the wire helices in their properly spaced relation, it has been necessary to corrugate the tube along its inner as well as its outer surfaces so as to provide a seating for the wire turns. This corrugation of the interior surface of the tubing has been unsatisfactory in that it has presented an additional form of resistance to the flow of the fluid within the tubing as mentioned above. Attempts have been made to correct this corrugation of the inner surface of the hose by means of positioning the reinforcing member between an inner and an outer tubular rubber body portion or by filling the corrugations of the inner surface with a "dough" of rubber or similar material. The resulting hose has been unsatisfactory, however, insofar as the addition of the rubber in the form of an inner tube or dough has impaired the flexibility of the resulting product and has increased the time consumed in its manufacture.

Still other attempts to achieve a relatively smooth and substantially continuous inner hose surface have involved the positioning of the reinforcing wire about the outer periphery of the hose body, but this has left the wire exposed to being damaged or separated from the tubular body during use and has not provided as great a radial reinforcement, particularly where the hose is to be used to transmit a vacuum such that the radial operating forces upon the same are from the outside toward the hose interior thus further acting to separate the hose body from the reinforcing wire. In addition, this positioning of the reinforcing wire about the outer periphery of the hose has increased the length of wire required to reinforce a given length of hose thereby also increasing the weight; and the fact that this wire is wound about the outer periphery of the hose has increased its bending moment to the detriment of the desired flexibility of the hose.

It is accordingly an object of the present invention to provide a fluid-impervious noncollapsible, flexible conduit which is reinforced against radial compression and collapse and is particularly adapted for use as vacuum cleaner hose.

It is a further object of the present invention to provide a fluid-impervious noncollapsible conduit having a corrugated exterior surface to improve its flexibility, a smooth interior surface to allow for the free and unrestricted flow of a fluid therewithin and a circumferential reinforcing member contiguous with the inner periphery of the hose to enhance its flexibility and prolong its life.

It is a further object of the present invention to provide a noncollapsible, circumferentially reinforced flexible conduit wherein the reinforcing member, notwithstanding its contiguity with the inner periphery of the hose, will not be subject to corrosion and premature deterioration and to separation from the tubular body.

It is still another object of the present invention to provide such a conduit which will at once be of light weight, appealing to the eye and economical to manufacture.

To achieve these and other objects and advantages of the present invention which will be apparent from a reading of the following disclosure, the conduit herein described is composed of a circumferential reinforcement having axially spaced turns and an organic plastic surface and a relatively thin organic plastic, deformable and stretchable envelope embracing said reinforcement and partially surrounding each turn thereof, thereby forming with the inner plastic surface of the reinforcement a substantially smooth, cylindrical inner conduit surface consisting of alternate bands of the plastic envelope and the plastic surface of the reinforcement. It is further provided that the plastic materials of the reinforcement and the envelope be joined together by fusion or adhesion to provide an integrated structure. The circumferential reinforcement is positioned near or contiguous with the inner periphery of the hose body as this periphery is defined by the alternate strips of the plastic material of the reinforcement and the surrounding envelope. The flexibility of the hose is enhanced by the corrugation of the exterior surface, and this corrugation is effected by forcing the plastic envelope inwardly to at least partially embrace the reinforcement such that the envelope itself in longitudinal cross section is corrugated or undulating, the crests of the inner corrugated surface, however, being occupied by and bonded to the plastic cover of the circumferential reinforcement to provide the desired substantially smooth, cylindrical inner surface.

The deformability and stretchability of the plastic envelope depend to a great extent upon its corrugated configuration to allow that portion of the tubular envelope on the outside of a bend in the hose to stretch freely so that a minimum of resistance is offered to such bending or flexing. At the same time the flexible and deformable nature of the envelope about the inner or fold side of a bend in the hose will offer minimum resistance to the compression normally taking place during such flexure. Notwithstanding the minimum resistance offered to the requisite stretching and compressing attending the bending of the hose, a unique feature of the hose of the present invention is that the spaced turns of the circumferential reinforcement are nonetheless maintained in their proper position and not allowed to overlap and collapse upon each other resulting in the loss of the necessary radial reinforcement. This collapse and interleaving of the spaced turns of the circumferential reinforcement is most apt to occur about the side of the hose toward the direction of its bending or flexure but is prevented in the case of the hose of the present invention by the pleating of the relatively thin, bonded, stretchable and flexible envelope between each of these turns to provide a barrier against the turn of one reinforcement riding up and over another contiguous turn.

It thus occurs that during the flexing of the hose, the plastic envelope reacts in two distinct manners with respect to its relationship to the circumferential reinforcement. On the side toward the direction of flexure as explained above, the envelope becomes pleated or "bunched up" between the consecutive turns of the reinforcement to provide a dam or barrier projecting slightly inwardly between the turns. On the other hand, the opposite portion of the hose or that portion of the envelope away from the direction of folding or bending is stretched under tension and is partially pulled away from the successive turns of the reinforcement such that the turns are left projecting slightly inwardly of the normally smooth, cylindrical inner hose surface. When the hose is returned to its straight position, of course, the elastic nature of the plastic material of the envelope is such that it returns to the desired substantially smooth, cylindrical configuration both on the fold and on the side away from the fold. Because of this important reaction resulting from the nature of the association between the plastic envelope and circumferential reinforcement, the relative dimensions of these two hose components and the physical properties of the materials of which they are composed are important. It has been found that an envelope wall thickness of substantially less than the cross sectional diameter of the reinforcement turn contributes to the improved results obtained by this invention.

In addition to the foregoing factors, it has been found preferable to provide suitable spacing of the turns of the reinforcing member. In order to obtain the most desirable degree of flexibility while avoiding kinking or folding during flexing, it is preferred to space the turns of the reinforcement so that the space between adjacent crests of the convolutions measuring on the outer surface of the tube, does not exceed ten times the diameter of the reinforcing member. Greater spacing has been found to give a hose which may not have sufficient flexibility; furthermore with relatively thin tubes as described, there will also be a tendency to draw the material inwardly under vacuum or force it outwardly under pressure. In addition, when the hose is subjected to external force or pressure, unless this degree of spacing is provided, it will collapse or flatten too readily with the turns being forced out of position.

With reference to the material to be employed in the envelope and circumferential reinforcement of the present invention, it is to be understood that, under proper conditions of compounding and manufacture, a broad range of plastic materials may be employed, organic plastic materials being defined as those materials containing as an essential ingredient an organic substance of large molecular weight, which is solid in its finished state, and, at some stage in its manufacture or in its processing into finished articles, is capable of being shaped by flow. It is preferred, however, that this material, particularly that of the envelope, be deformable and stretchable. To be included in this group of preferred materials are natural rubber, the various synthetic rubber-like compositions such as the polychloroprenes known as neoprene, the butadiene-styrene copolymers known as Buna-S or GR-S, the butadiene-acrylic nitrile copolymers referred to as Buna-N or GR-A, the various polysulphides known as Thiokol, butyl rubber, the various moldable organic thermoplastic materials such as the vinyl copolymers, the cellulose plastics such as cellulose acetate, cellulose acetate butyrate, polyethylene and the like. While the sheet or envelope of the hose will generally be composed primarily of one of these materials or a mixture or combination of any of them, the reinforcement may be similarly composed or may comprise a wire or resilient metallic core surrounded by a surface coating of such plastic material.

The above-described principles and features of the present invention may be more clearly understood from a reading of the following detailed description in connection with one preferred embodiment employing the same. For the purposes of this description, reference may be had to the appended drawings in which.

Figure 1:
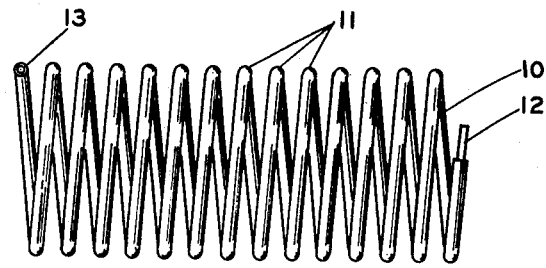
Figure 1 is an elevation in partial cross section showing a reinforcement suitable for incorporation in the flexible, non-collapsible conduit of the present invention.

The circumferential reinforcement 10 in Figure 1 is shown to consist of axially spaced turns 11 formed from a continuous composite element wound in helical fashion. While helical types of reinforcement formed from a continuous element are most generally used in the art of flexible conduit reinforcement, it is to be understood that this reinforcement may also consist of spaced, individually complete turns which may, if desired, be joined by suitable cross links. In the preferred embodiment of Figure 1, the reinforcement consists of a helical coil of wire or similar metallic substance 12, surrounded with a coating of plastic material 13 of the class of materials as set forth above. While the wire core 12 is provided to supply the desired radial reinforcement and springiness, it is to be understood that the element 10 might consist entirely of a plastic material where such materials are compounded to provide the necessary strength and rigidity and at the same time to have those surface characteristics necessary for the integration of the hose as hereinafter more fully described. The plastic coating 13 may be deposited upon the wire core 12 before or after it is formed into the desired reinforcing helix. This deposition of the plastic material upon the metal member may be by simple immersion in or spraying with the plastic material or by an application of the plastic in sheet form by a well-known operation known as "slubbing." The plastic coating may also be applied, preferably while the wire is still straight or only loosely coiled, by extruding a plastic cover directly upon the wire. In any case, no attempt is made to adhere the plastic wire coating to the wire core itself, it being entirely satisfactory if this wire core is able to move somewhat relative to its surrounding sheath or coating.

The reinforcing member is generally round or possesses a substantially circular cross section.

Figure 2:
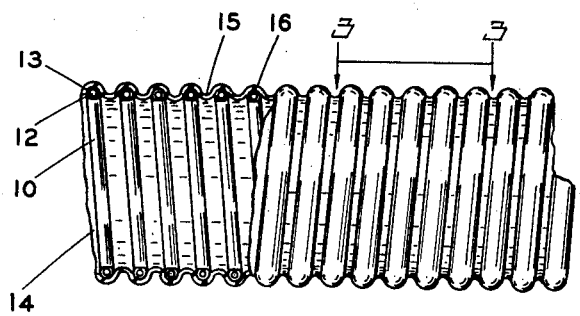
Figure 2 is an elevational view in partial cross section of the finished conduit according to the present invention showing the exterior corrugated configuration of the same.

The hose shown in Figure 2 is formed by placing a relatively thin-walled tubular envelope 14 about the helical member 10 of Figure 1. The exterior corrugation is provided by forcing this sheet inwardly between the turns of the reinforcement to form the troughs 15 between the crests or peaks 16.

Figure 3:
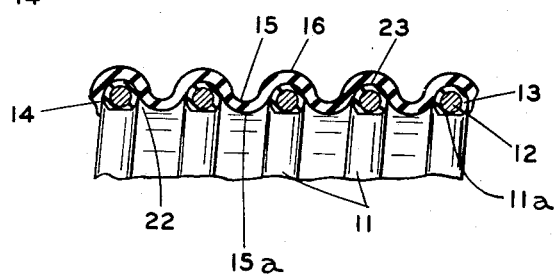
Figure 3 is a longitudinal cross section through the hose of Figure 2 taken on the line 3—3 thereof.

As best shown in Figure 3, this corrugation of the envelope is performed in a manner which will cause the inner surface of the envelope at those points forming the troughs 15 between the reinforcing turns 11 to extend into the plane established by the inner periphery of the aligned turns resulting in a substantially cylindrical inner surface. In order that the substantially smooth, cylindrical inner hose surface according to this invention may be most nearly approached, the inner periphery of the envelope may be made straight and flat rather than curved with the innermost surface of the reinforcement turns similarly flattened so that all of the flattened surfaces of both reinforcement turns and envelope lie in the same plane. This may be accomplished by the application of sufficient pressure differential during fabrication so that the innermost portions of the tube will also be flattened.

In the manufacture of this type of hose to provide the desired substantially cylindrical inner surface and at the same time an integrated construction wherein the reinforcement turns are an integral part of the hose assembly, the plastic material selected for these respective components; i.e., the plastic envelope and at least the surfaces of the circumferential reinforcement, should be sufficiently similar or related to the extent that upon achieving their respective states of plastic flow they will coalesce or fuse together or at least will be capable of permanent adhesion. Instead of fusion, these components may be adhered by means of solvents or adhesives.

In the manufacture of one preferred embodiment of a hose similar to that shown in the drawings, the wire core 12 of Figure 1 is passed through a typical crosshead insulating tuber or extrusion machine to obtain the plastic sheath or wire coating 13.

A typical plastic composition to be employed as the wire coating might be as follows:

| | Parts by weight |
|---|---|
| Polyvinyl chloride resin | 100 |
| Stabilizer (e.g., lead stearate) | 2 |
| Softener (e.g., dibutyl phthalate) | 30 |
| Wax lubricant | 1 |

The wire thus coated may then be run through a conventional spring forming machine to form the helical windings providing the spaced reinforcement turns 11. In actual practice it may be desirable to form this plastic coated wire spring with the coils or turns thereof closely spaced or actually contiguous.

This coil may then be spaced about a hollow perforated mandrel the outside diameter of which corresponds to the desired inside diameter of the final hose. In positioning the wire helix upon the mandrel a screw driven guiding arm may both separate the tightly wound turns of the preformed coil and at the same time place each of said turns under slight tension bearing against the mandrel surface. In one preferred hose construction, the successive turns of the helical reinforcement are spaced by one-fourth of an inch, the coil in its finally spaced position being firmly held by tape or suitable clamps at its ends.

A preformed tubular envelope of a similar plastic material is then placed about hte circumferential reinforcement as it is spaced upon the perforated building mandrel. This positioning of the envelope, the inside diameter of which is equal to or only nominally larger than the outside diameter of the building mandrel, may be conveniently performed by slipping one end of the sheet or envelope about the end of the mandrel and applying air pressure to the other end of the tube with the result that the same will expand radially and slip easily upon the mandrel, notwithstanding the presence thereon of the reinforcement. While the inherent elasticity of the plastic material employed in the envelope may cause the same to become corrugated and to partially embrace each of the turns of the circumferential reinforcement, it is usually desirable and necessary that additional corrugating forces be applied so as to pull the envelope down against the building mandrel at those points between the longitudinally spaced turns of the reinforcement. While this operation has traditionally involved the application of a forming cord wound about the exterior of the envelope between the turns of the reinforcement of the hose, it has been found that, particularly where plastic materials are involved and such materials are heated to the state at which they are capable of plastic flow, the corrugation may be conveniently effected by proper utilization of a pressure differential between the atmosphere surrounding and that within the hose. Since a perforated mandrel is involved in one preferred method of constructing the hose of this invention, a pressure differential between the exterior of the hose and the interior of the mandrel will accomplish the desired corrugating results. To establish this pressure differential the tubular sheath or envelope 14 may be placed about the mandrel so as to cover the perforations in the mandrel wall and the ends of the mandrel may be sealed. When the mandrel with the hose construction thereon is then placed in an atmosphere of greater pressure, as in the case of a pressurized vulcanizer or oven, the greater external pressure will act radially inwardly against the mandrel to accomplish the desired corrugation. Instead of thus increasing the pressure exteriorly of the hose mandrel assembly, the same effect may be accomplished by evacuating air from the interior of the mandrel once the plastic envelope has been placed thereon so as to seal off the perforations in the mandrel wall. This evacuation may be accomplished by means of a conventional vacuum pump and may be first drawn on the mandrel interior which is then sealed or may be maintained by constant pumping during the heating and forming of the plastic materials.

No matter what expedient is used to force the plastic envelope 14 against the mandrel, the elevation of the temperatures of the plastic materials above their melting or softening point will be such that these materials will in effect be molded against the smooth, cylindrical surface of the mandrel and a substantially smooth, cylindrical surface will be imparted to the inner periphery of the hose. At the same time, the softened condition of the plastic materials will be such that they will fuse or coalesce during this heating to provide an integrated structure in which the wire coating 13 will become permanently associated with the plastic envelope 14. Where a thermosetting substance such as the vulcanizable rubbers and the synthetic rubbers is employed, it will be necessary to maintain vulcanization temperatures and pressures until such time as the vulcanization can be completely carried out. On the other hand, where thermoplastic substances such as the polyvinyl chloride resins are employed, the plastic materials need be maintained at elevated temperatures only long enough to allow a complete softening and perfect flow of these materials in the formation of the corrugated hose. In the case of purely thermoplastic substances, of course, it will be necessary to maintain the corrugating forces such as the pressure differential between the exterior and interior of the hose body until the plastic materials are cooled below their softening point or the state in which they are capable of plastic flow.

The plastic material employed in the envelope may be composed of a substance similar to that set forth above in connection with the wire coating. Along with this same form of wire coating, however, a vulcanizable compound such as rubber or any of the well-known synthetic rubber compositions may be employed and a mixture of such a composition together with a polyvinyl chloride resin has been found particularly suitable. This specific composition is made up of the following parts by weight:

| | Parts by weight |
|---|---|
| Butadiene-acrylonitrile copolymer | 95 |
| Polyvinyl chloride resin | 55 |
| Filler (e.g., hydrated silicate dioxide) | 20 |
| Plasticizer (e.g., dibutyl phthalate) | 10 |
| Sulfur | 1.5 |
| Accelerator (e.g., benzothiazyl disulfide) | 1.5 |

Figure 4:
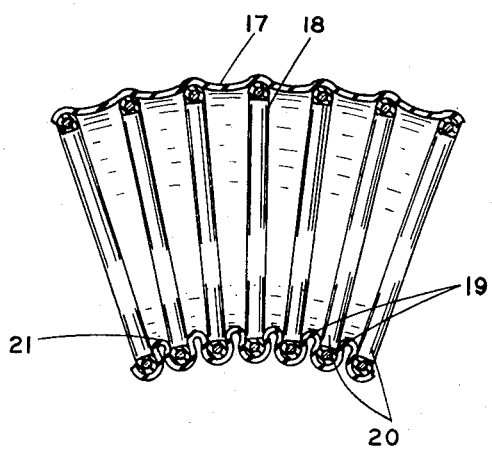
Figure 4 is a similar longitudinal cross section of the same hose as it appears when flexed.

Referring now to Figures 3 and 4, the precise nature of the inner conduit surface and the manner in which the same behaves upon flexure of the hose can be more closely observed. It is to be noted that the inner surface of the reinforcement becomes flattened against the mandrel during the formation of the hose as described above, but the entire surface of the conduit is not actually unbroken in view of the fact that the envelope rises above and passes around each successive reinforcement turn. Thus at each of said turns there is at least a small line or channel 22 lining each side of the reinforcement turns and slightly interrupting the continuity of the inner hose surface. Since, however, the flattened segments 11a of the reinforcement turns and the innermost portions 15a of the envelope 14 are aligned at the same plane longitudinally of the hose, the flow of air within the conduit is substantially uninterrupted and the effect of a smooth hose is provided. When a hose such as that shown in Figure 3 is flexed in the manner shown in Figure 4, it will be noted that those portions 17 of the envelope lying between the reinforcement turns 18 in a direction away from the direction of the flexure are caused to stretch and tend to pull up and away from their normally snug partially surrounding engagement with the reinforcement turns. At the same time those portions 19 of the envelope between reinforcement turns 20 on that side of the hose toward the direction of flexure tend to become pleated or to "buckle up" between the respective reinforcement turns.

Applicants have found that the material most suitable for this type of behavior upon flexure is at once readily deformable and sufficiently elastic to recover its original position as soon as the flexure is released such that the inner surface of the conduit will return to a substantially smooth, cylindrical configuration. Applicants have found further, that notwithstanding the nature of the material employed, the most satisfactory results may be obtained if the wall thickness of the plastic envelope is relatively thin with respect to the dimensions of the circumferential reinforcement such as the diameter of the coated wire. Where a relatively thin envelope is employed, not only will the material more readily stretch on that side of the hose away from the direction of the fold and allow for the separation of the turns at this point, but also that portion of the envelope toward the direction of bending will be easily pleated into proper position between each of the suggested turns at the bottom. As each of these turns tends to separate at the top or outside of the fold, it follows that each of the same turns tends to crowd other turns at the bottom. As this crowding together takes place, it has been a common failure in the prior art hoses that the turns would slide or telescope together such that the radial reinforcement of the member would be lost and the hose would be subject to collapse upon subjection to radial loads from the outside. A unique feature of the present hose incorporating the relatively thin plastic envelope surrounding the circumferential reinforcement is that notwithstanding the relative tenuity of the envelope and the attendant ease of stretching and recovery from being stretched, a satisfactory barrier against the above-described undesirable telescoping of the successive wire turns is provided by virtue of the fact that the envelope bends so readily to form the small barriers 21 between each of the turns. Since each of these turns has a surface integrally associated with the envelope, and is thereby held in fixed position relative to this envelope, the pleating of this thin envelope upon bending of the hose is all that is required to prevent the loss of reinforcement and hose collapse.

While the preservation of the proper spacing of the reinforcing turns requires that each turn be permanently associated with the surrounding envelope, it is possible and sometimes desirable that this permanent association be confined substantially to a narrow path following the very outermost periphery of the wire as it is coiled. Thus, that portion of the elastic envelope normally embracing the wire would be free to straighten out upon a bending of the hose, allowing a greater extension on the side of the hose away from the direction of bending before the material of the envelope would have to be stretched thereby considerably enhancing the flexibility of the hose. Since the material is of an elastic nature, the envelope would return to its normal wire-embracing position upon a straightening of the hose so that the desired substantially smooth inner hose surface would be maintained notwithstanding the use of this expedient for enhancing flexibility.

In Figure 3 for example, the coating 13 of the wire 12 may be adhered to the envelope 14 only along a very narrow path following that portion of the outer periphery of the reinforcing member designated by number 23. Even though the actual area of adhesion between envelope and coated wire is thus somewhat limited, the envelope because of its moldable and elastic properties, may be made to embrace the wire turns over a substantial portion of their area. In such cases, this wire-embracing, non-adhered portion of the envelope 14 is free to pull away from the wire to enlarge the channel 22, but will return to its wire-embracing position upon a straightening of the hose. At the same time the normally coplanar surfaces 11a and 15a of the envelope and reinforcing member respectively will return to their common plane to provide the desired substantially smooth inner hose surface.

Where the area of adhesion between the envelope and coated wire is thus limited, it follows that, upon severe flexing of the hose, the envelope will be pulled away from its position in the plane of the unflattened portions of the normally coaxially aligned reinforcement turns. While this does somewhat alter the substantially smooth, cylindrical nature of the inner conduit surface, it has been found that the continued presence and alignment of the flattened portions 11a of the reinforcement turns provides a substantially continuous surface which is still capable of transmitting fluids more efficiently than previous corrugated hose constructions.

Because of this effect of the flattened segments on the air transmission properties of the hose, it is not absolutely necessary that those portions of the corrugated envelope between the reinforcement turns be flattened so long as the turns are relatively closely spaced and are themselves flattened along those portions thereof exposed to the interior of the conduit. In such cases the troughs of the corrugated envelope need be only deep enough that their innermost convolutions 15a are tangent to the line or plane established by the various flattened portions of the reinforcement turns. An improved hose so constructed has been found to be achievable where the successive reinforcement turns are spaced by a distance which is less than ten times the cross-sectional diameter of the material forming such reinforcement.

While the particular envelope thickness will depend upon the size of the hose and the size of the reinforcement employed, it has been found that for hose constructions ranging in inside diameter from ½ in. to 2½ in., a tubular wall thickness of substantially one-half the diameter of the circumferential reinforcement, i.e., the wire helix with its plastic coating thereon, or less is preferred. As one preferred embodiment, applicants have successfully constructed and used a hose having a 1¼ in. inside diameter, employing as a reinforcement a plastic coated steel wire helix, the successive turns of which were spaced by ¼ in. between centers, and the overall diameter of which was 5/64 in., with the plastic envelope having a wall thickness of 1/32 in.

It is clear that obvious modifications and variations of this invention may be made without departing from the spirit and scope thereof as defined in the appended claims.

We claim:

1. A flexible relatively noncollapsible conduit comprising a circumferential reinforcing member in the form of a coiled helix having spaced turns, said member having a plastic surface, a relatively thin plastic and deformable tube embracing and partially surrounding said reinforcing member, said tube having corrugations formed therein which depend between the turns of the helix, with the inner surface of the tube between the coils of said helix extending substantially to the plane of the innermost surface portion of said coiled member and with the inner surface of said tube which embraces said reinforcing member being bonded thereto over a portion only of the embraced area at the crests of said corrugations along the outer periphery of said reinforcing member with the remaining area of said surface embraced by said tube being left unbonded leaving the innermost surface area of the coiled member exposed, the resultant conduit having a corrugated exterior and a relatively smooth and continuous interior surface defined by the inner portions of the tube between corrugations and the exposed inner surface of said coiled member, whereby on the application of tension as by bending or stretching the portion of the tube normally embracing but unbonded to the reinforcing member will pull away therefrom and return to embracing position on release of said tension.

2. A conduit according to claim 1 wherein the spaced turns have a circular cross section truncated by a flat surface about the inner periphery of the helix formed in the plastic surface thereof.

3. A conduit according to claim 1 wherein the reinforcing member comprises a wire coil the convolutions of which have a plastic covering.

4. A conduit according to claim 2 wherein the plastic material of the tube and the plastic covering of the reinforcing member comprises a polyvinyl chloride resin.

5. A conduit according to claim 2 wherein the plastic material of the tube and the plastic covering of the reinforcing member comprises a blend of polyvinyl chloride resin and a synthetic rubber.

6. A flexible relatively noncollapsible conduit comprising a circumferential reinforcing member in the form of a coiled helix having spaced turns, said member having a plastic surface, a relatively thin plastic and deformable tube embracing and partially surrounding said reinforcing member, said tube having corrugations formed therein which depend between the turns of the helix, the inner surface of said tube which embraces said reinforcing member being bonded thereto over a portion only of the embraced area at the crests of said corrugations along the outer periphery of said reinforcing member with the remaining area of said surface embraced by said tube being left unbonded leaving the innermost surface area of the coiled member exposed, the resultant conduit having a corrugated exterior which is smooth and unbroken between corrugations and a relatively smooth and continuous interior surface defined by the inner portions of the tube between corrugations and the exposed inner surface of said coiled member, whereby on the application of tension as by bending or stretching the portion of the tube normally embracing but unbonded to the reinforcing member will pull away therefrom and return to embracing position on release of said tension.

References Cited in the file of this patent

UNITED STATES PATENTS

| | | |
|---|---|---|
| 489,478 | Hopkinson | Jan. 10, 1893 |
| 2,550,099 | Vance | Apr. 24, 1951 |
| 2,560,369 | Roberts | July 10, 1951 |
| 2,641,302 | Martin et al. | June 9, 1953 |